US006188675B1

(12) United States Patent
Casper et al.

(10) Patent No.: US 6,188,675 B1
(45) Date of Patent: *Feb. 13, 2001

(54) SYSTEM AND METHOD FOR SELF-IDENTIFYING AND CONFIGURING THE NODES OF A NETWORK

(75) Inventors: Daniel Francis Casper, Poughkeepsie; Thomas Anthony Gregg, Highland, both of NY (US); George Wayne Nation, Eyota, MN (US); Kenneth Blair Ocheltree, Ossining, NY (US); Charles Bertram Perkins, Jr., Cedar Park, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/702,778

(22) Filed: Aug. 23, 1996

(51) Int. Cl.[7] .................................................. H04L 12/28
(52) U.S. Cl. ........................... 370/254; 370/401; 370/475
(58) Field of Search ..................................... 370/254–258, 370/238, 351, 389, 400, 401, 453, 475

(56) References Cited

U.S. PATENT DOCUMENTS

| | | | |
|---|---|---|---|
| 4,335,426 | * 6/1982 | Maxwell et al. .................. 364/222.2 |
| 4,466,060 | 8/1984 | Riddle .................................... 364/200 |
| 4,491,946 | * 1/1985 | Kryskow, Jr. et al. .............. 370/453 |
| 4,731,880 | * 3/1988 | Ault et al. ............................ 359/120 |
| 4,734,907 | * 3/1988 | Turner .................................. 370/390 |
| 5,073,900 | * 12/1991 | Mallinckrodt ........................ 370/320 |
| 5,128,926 | 7/1992 | Perlman et al. ........................ 370/54 |
| 5,191,580 | * 3/1993 | Nakano et al. ........................ 370/453 |
| 5,291,491 | * 3/1994 | Hutchinson et al. ................. 370/453 |
| 5,297,138 | 3/1994 | Black .................................... 370/60 |
| 5,319,633 | 6/1994 | Geyer et al. ........................... 370/17 |
| 5,369,705 | 11/1994 | Bird et al. ............................. 380/21 |
| 5,371,897 | 12/1994 | Brown et al. ........................ 395/800 |
| 5,450,408 | 9/1995 | Phaal .................................. 370/85.13 |
| 5,483,517 | * 1/1996 | Kurata et al. ......................... 370/241 |
| 5,504,746 | * 4/1996 | Meier .................................... 370/256 |
| 5,563,883 | * 10/1996 | Cheng .................................. 370/449 |
| 5,732,086 | * 3/1998 | Liang et al. ......................... 370/410 |
| 5,737,318 | * 4/1998 | Melnik ................................. 370/254 |
| 5,802,321 | * 9/1998 | Buda et al. .......................... 709/251 |
| 5,903,561 | * 5/1999 | Kwon .................................. 370/382 |
| 5,964,837 | * 10/1999 | Chao et al. .......................... 709/224 |
| 6,026,075 | * 2/2000 | Linville et al. ...................... 370/236 |

\* cited by examiner

*Primary Examiner*—Chau Nguyen
*Assistant Examiner*—Soon-Dong Hyun
(74) *Attorney, Agent, or Firm*—Heslin & Rothenberg, P.C.

(57) ABSTRACT

A system and method for progressively identifying and configuring the nodes of a network having an unknown or partially unknown topology are presented. A special all-node address indicator is designated for insertion in a packet to be sent from a given node with known node address to a next adjacent node with unknown node address. Each node contains a port control register for each port of the node which when set instructs the node to insert the all-node address indicator into a packet to be forwarded to a next adjacent node in the network with unknown node address. The port control registers are remotely selectively set by one or more managing nodes of the network. Race condition is avoided by provision of a set count register associated with an address node register and managing node address register within each node of the network. A node can be configured only if the previously read set count value remains unchanged between reading of and writing to the address node register or managing node address register. Provision for identifying additions, deletions and other changes to the network automatically is also provided.

33 Claims, 5 Drawing Sheets fig. 1 fig. 4 fig. 5A fig. 5B

SYSTEM AND METHOD FOR SELF-IDENTIFYING AND CONFIGURING THE NODES OF A NETWORK

TECHNICAL FIELD

The present invention relates in general to communication networks, and more particularly, to a system and method for self-identifying and configuring the interconnected nodes of a network having an unknown or partially unknown topology. The plurality of interconnected nodes of the network includes multiple switch nodes connected together by links.

BACKGROUND ART

The configuring of nodes in a communication switching network, such as employed by International Business Machines in their RS/6000 Workstation architecture, is typically performed statically, with each node preassigned an addressed before the switch network is utilized. However, such static configuring of network nodes is inherently inflexible and adds complexity to a network installation process.

Conventionally, the nodes of a network can also be configured by mapping the topology of the network through either the exchange of information on a separate network, or through the passive monitoring of traffic on the network. Clearly, the addition of a separate, second network to determine topology of a first network adds cost and complexity to a system. Further, passive monitoring of traffic on a network can require an unacceptably long delay before the network topology is known.

Fiber distributed data interface (FDDI) and token ring both use neighbor notification methods where nodes send packets that are only received by their neighboring nodes. This approach allows individual nodes to communicate only with their direct neighbors, but by monitoring traffic on the network, a remotely located managing node can discover the neighbors of all other nodes in the network. This method means waiting for all nodes of the ring to transmit to their neighbors, often requiring as long as thirty seconds to complete, which can comprise an unacceptable latency. Further, this method requires that the managing node be disposed within the ring itself.

As more computer systems incorporate interconnection or switching networks as a highbandwidth fault-tolerant means of connecting processors and input/output (I/O), a quick and inexpensive approach to identifying and configuring the nodes of the network becomes important. The use of such interconnection networks in personal computer (PC) systems places an even stronger requirement on the initialization approach; i.e., it should automatically recognize new devices and properly configure them, while still being quick and inexpensive. With personal computers moving to plug and play capabilities, it is only a matter of time before workstations must be able to self-identify their internal interconnection topology. The present invention addresses this need by providing an approach that allows network self-identification.

More particularly, an approach for configuring nodes is needed that can explore an interconnection network having unknown topology using the network itself. Further, an approach is desired which allows the searching of unknown portions of the network so that new devices can be discovered, along with a method for configuring nodes that allows multiple managing nodes to remotely initialize the network, without race conditions causing errors or conflicts. The present invention addresses each of these needs.

DISCLOSURE OF THE INVENTION

Briefly summarized, the invention comprises a system for use in identifying the topology of a network having a plurality of nodes. Each node includes a port for transfer of a packet to a next adjacent node in the network. The system includes an all-node address indicator and means for selectively employing the all-node address indicator. The all-node address indicator is designed for selective insertion in a field of the packet, wherein when inserted in the field of the packet, the all-node address indictor causes the packet to be received by the next adjacent node in the network notwithstanding that a node address of the next adjacent node in the network is unknown upon forwarding of the packet. The means for selectively employing the all-node address indicator comprises means for selectively inserting the indicator into the packet at each node of the network with a known node address having a next adjacent node in the network with an unknown node address.

In a more specific aspect, the invention comprises a system for use in identifying the topology of a network having a plurality of interconnected nodes. Each node includes a port for transfer of the packet to a next adjacent node in the network. The system includes an all-node address indicator for selective insertion in a field of the packet, wherein when inserted in the field, the all-node address indicator causes the packet to be received by the next adjacent node in the network. Each node has a port control register for each port which when set instructs the node to insert the allnode address indicator into the field of the packet before forwarding the packet to the next adjacent node in the network. Means are provided for remotely, selectively setting the port control registers associated with the ports of the plurality of interconnected nodes. The all-node address indicator causes the packet to be received by the next adjacent node in the network notwithstanding that the node address of the next adjacent node coupled to the particular port of the node is unknown when forwarding the packet.

In a further aspect, a self-identifying network is provided which includes a plurality of interconnected nodes, each node having a port for transfer of a packet to a next adjacent node in the network. An all-node address indicator is provided for selective insertion in a field of the packet, wherein when inserted in the field, the all-node address indicator causes the packet to be received by a next adjacent node in the network notwithstanding that the next adjacent node has an unknown node address. Automatic means selectively employs the all-node address indicator at each node of the network with a known node address having a next adjacent node with an unknown node address, to thereby identify the topology of the network.

In a still further aspect, the invention comprises a method for identifying topology of a network having a plurality of interconnected nodes, each node having a port for transfer of a packet to a next adjacent node in the network. A given node of the plurality of interconnected nodes has a known node address and is connected to a next adjacent node with an unknown node address. The method includes: sending a packet to the given node with known node address for output to the next adjacent node with unknown node address; upon receipt of the packet at the given node, providing in the packet an all-node address indicator, the all-node address indicator directing the packet to be received by any node of the plurality of interconnected nodes; and sending the packet with the all-node address indicator to the next adjacent node with unknown node address such that the packet is received at the next adjacent node.

To restate, this invention comprises a system and method for identifying and configuring the nodes of a network when an unknown or partially known topology is present. The invention employs a progressive identification of the network by allowing the interrogation of next adjacent network nodes beyond those previously identified. Specifically, network topology is progressively discovered through a process that proceeds by identifying the network node by node, where each additional new node is located at the other end of a link from a previously identified node. The approach presented herein allows self-identification of the network, while still being inexpensive to implement. Further, an approach is presented for configuring all nodes of the network so that node configurations can be managed from multiple managing nodes in the network simultaneously. Monitoring of a discovered topology is possible to identify additions, deletions or other changes to the network. Race conditions or conflicts between multiple managing nodes are avoided. The system/method can be employed with any arbitrarily connected topology made up of managing nodes, switch nodes and end nodes.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

BEST MODE FOR CARRYING OUT THE INVENTION

As noted, presented herein is an approach for discovering and configuring the nodes of a network having an unknown or at least partially unknown topology. The invention employs a progressive discovery of the network by allowing for the interrogation of a next adjacent node beyond a previously identified and configured node. Further, presented herein is a technique for configuring the nodes of the network such that all nodes can be configured and managed from multiple managing nodes in the network. Additionally, a mechanism is provided for automatically identifying and reconfiguring the network in response to a node addition, deletion or other change in the network.

Network topology is uncovered and then configured on a link-by-link basis through the network switches. A special all-node address indicator is designated so that whenever a node (e.g., switch node or end node) observes a request packet with that address indicator, the node will receive the packet. Also, there is a port condition register or mode control register, for each port of a node, which can be remotely set so that all packets leaving the node through that port will have the all-node address indicator. This allows packets to be sent one node further in the topology than a node with known address node. Once reached, the new node address register and managing node address register are read or configured by communicating appropriate read and write packets, thus allowing identification and configuration of the network. The method/system of the present invention can be employed with any arbitrarily connected topology consisting of managing nodes, switch nodes and end nodes.

Figure 1:
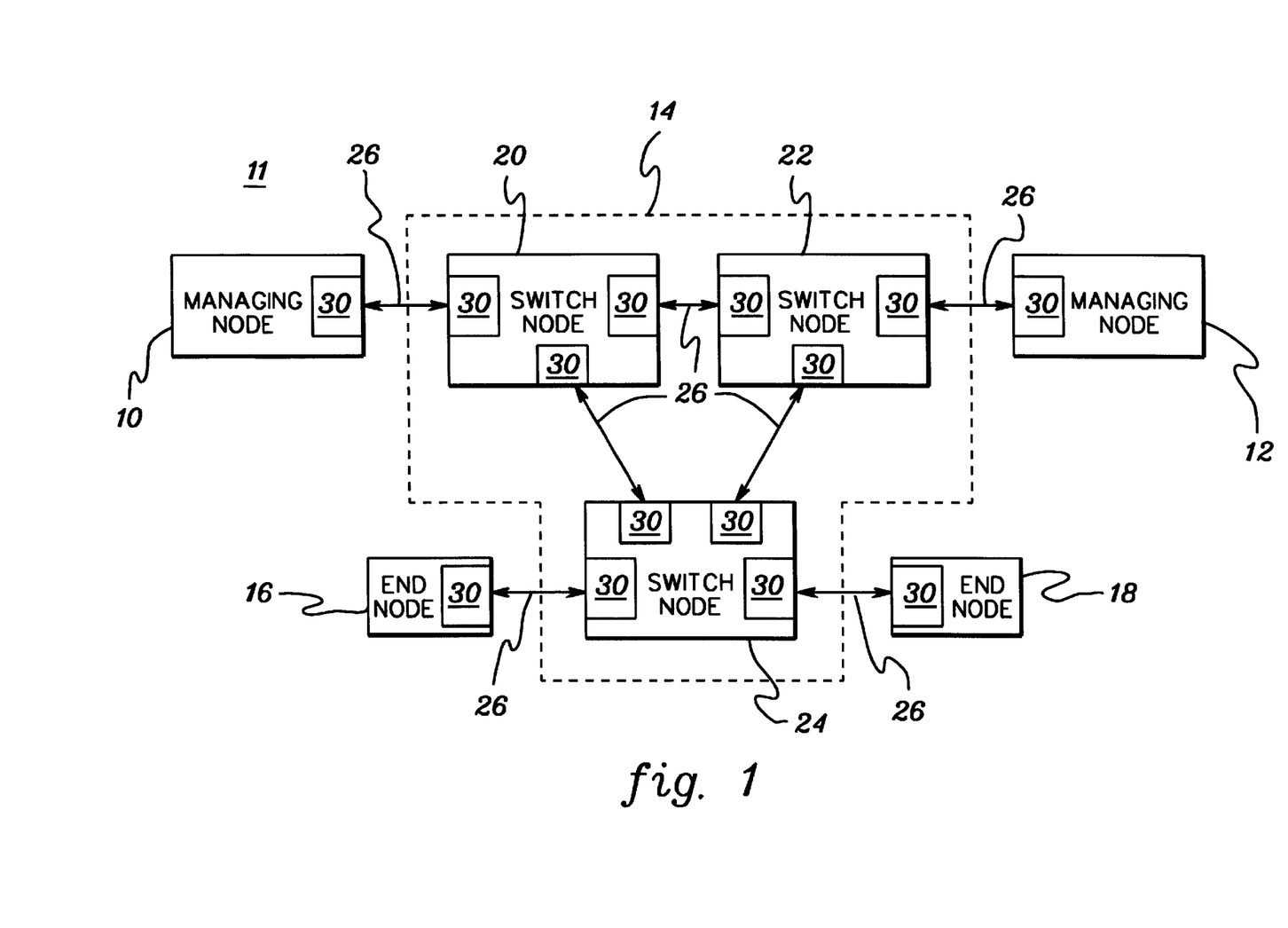
FIG. 1 is a sample interconnection network topology to be identified and configured in accordance with the present invention.

FIG. 1 presents a sample topology of a network employing a self-identification system/method in accordance with the present invention. Within the interconnection network, generally denoted 11, there are managing nodes (MN) 10 & 12, end nodes (EN) 16 & 18, and switch nodes (SN) 20, 22 & 24 in a switching arrangement 14. The nodes of network 11 are connected via multiple links 26. Each link 26 can comprise a dual simplex communication path which interconnects two adjacent nodes in the network 11. The link protocol supports independent communication on the link in both directions, but if a hard failure is detected in one direction, the other direction is disabled so that nodes at both ends of the link are made aware of the failure. A port 30, described below, is disposed in each node at each end of a link. Nodes 10, 12, 16, 18, 20, 22 & 24 may contain multiple ports 30, such as shown by example at switch nodes 20, 22 & 24.

A managing node (MN) is a node in the network which is capable of configuring other nodes of the network. A managing node typically comprises a processing node capable of resolving conflict. A switch node (SN) is a node that has multiple ports and is capable of routing network traffic between the multiple ports. An end node (EN) is a node that is not a managing node or a switch node, and is typically used to attach input/output (I/O) devices or additional computing resources to the network.

Figure 2:
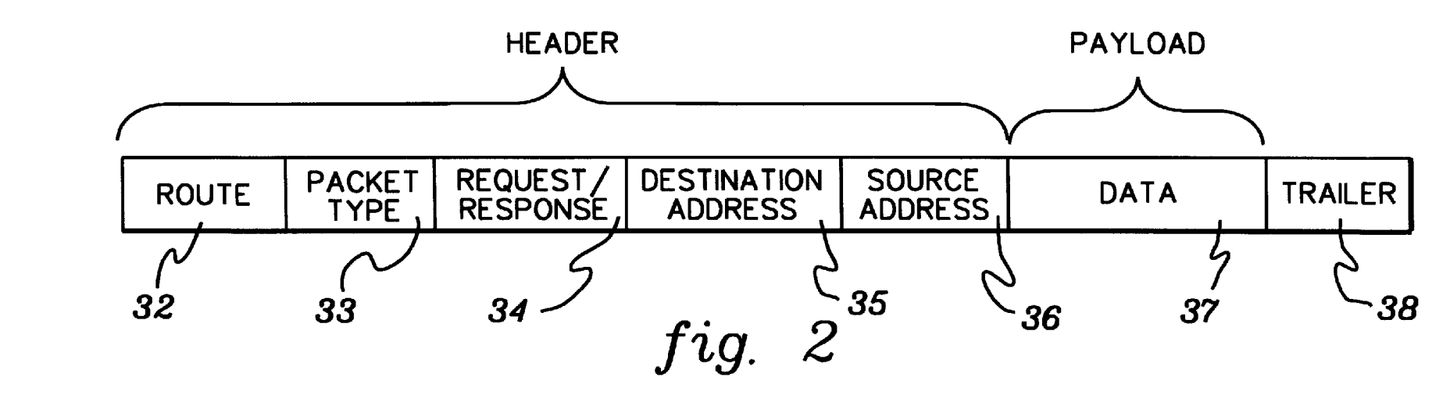
FIG. 2 is an example of one embodiment of a packet format for use in the interconnection network of FIG. 1.

Communication occurs within the network via packets with header, data and trailer fields as shown by example in FIG. 2. The packet header includes: a routing field 32 which specifies the path that the packet will take through the network; a packet type indication 33, i.e., a read, write, interrupt, I/O operation; a request/response field 34 which identifies the nature of the packet; a destination address field 35 that specifies the final destination of the packet; and a source address field 36 which identifies the source node originating the packet. The packet further includes the data or payload 37 and one or more trailer fields 38, e.g., a redundancy check to ensure data accuracy.

Figure 3:
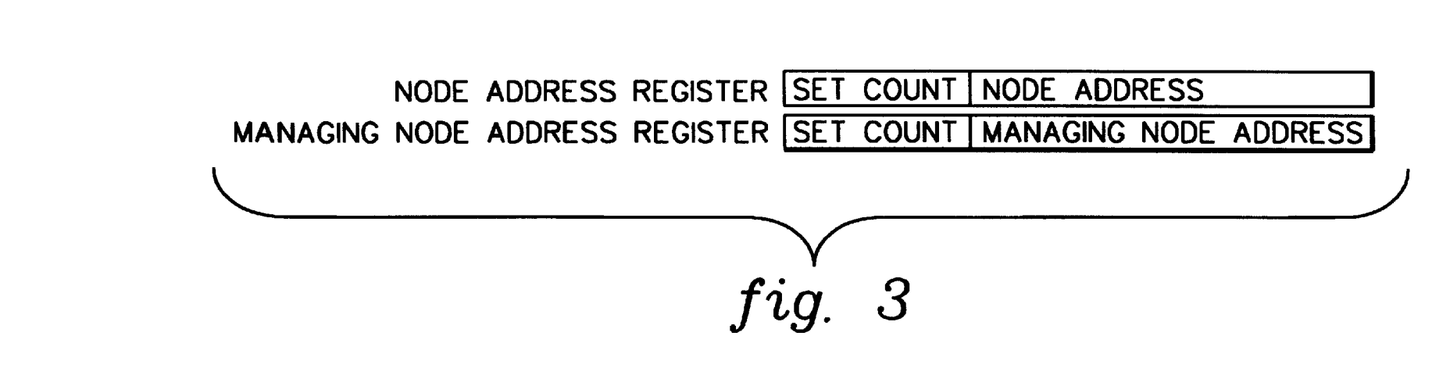
FIG. 3 depicts two registers maintained at each node of the interconnection network of FIG. 1 in accordance with the present invention.

In accordance with the invention, all nodes in the network contain two address registers, one embodiment of which is depicted in FIG. 3. The first register comprises a node address register, and the second comprises a managing node address register for the particular node. The first register contains the address of the node itself, while the second register designates the managing node that has initialized and configured the address and routing for the particular node. In addition to containing the address field, each register also contains a set count field which can be advantageously employed in accordance with the present invention to prevent race conditions in the setting of the respective registers.

In particular, when either address register is read, the value of the set count is returned with the address value. When an address register is to be written and changed, the associated, previously read set count value accompanies the request, and the address register can only be changed if the previously read set count value accompanying the new address being written matches the set count value now contained in the address register. After successfully writing a new address, the associated set count is incremented. When an attempt to write an address register is made and the set count does not match, a status is returned to the managing node indicating the condition.

To restate, the process for writing an address register is to first read the address register, then write the new value for the register including the set count value from the read. The register only allows the writing of the new value if another new value has not been written since the time the register was read. Thus, this procedures allows only one managing node to write an address register without interference from other managing nodes.

Figure 4:
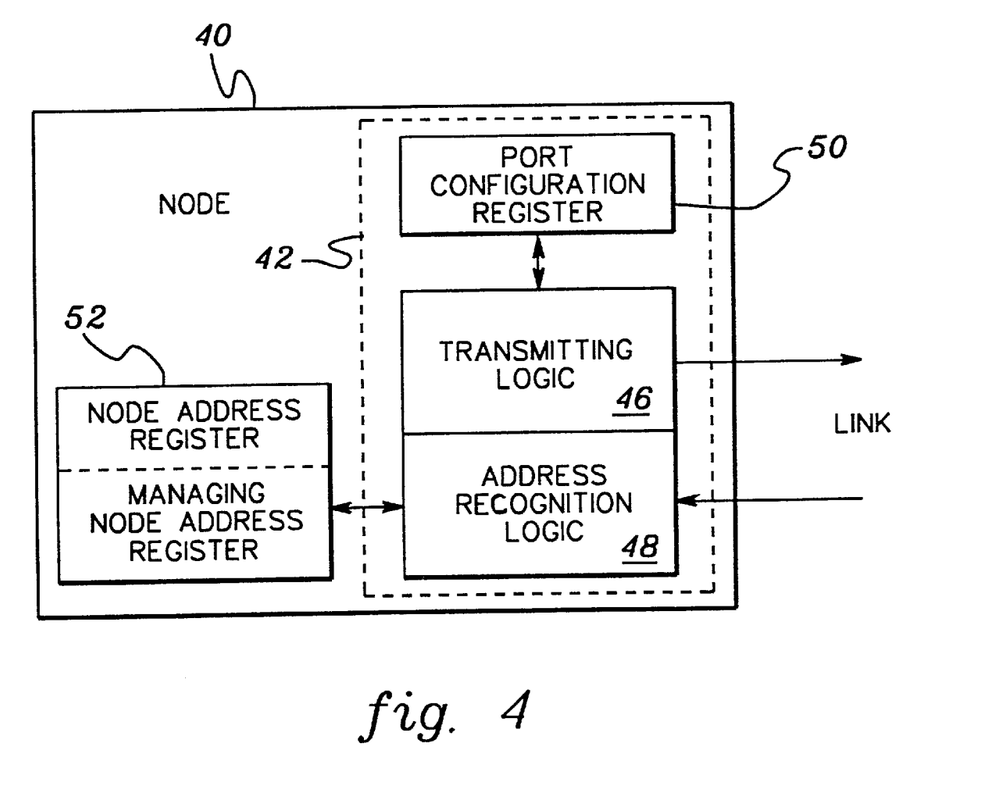
FIG. 4 depicts one embodiment of a port structure in accordance with the present invention for use in a node of the interconnection network of FIG. 1.

At each end of every node 40 are ports, with a port 42 consisting of both transmitting logic 46 and receiving logic 48 as depicted in FIG. 4. In accordance with the invention, transmitting logic 46 contains control logic for converting, for example, the destination field or routing field of a request packet to a universal, all-node address designation, such as an all zeros address. Control logic 46 can be enabled by a bit in a port configuration or mode control register 50. The receiver logic for each port consists of the logic to receive packets that match on either of two different destination address values, i.e., the unique value set in the node address register 52 for the particular node containing the port or the predefined all-node address designation (e.g., all zeros address value). The managing node address register and node address register 52 are coupled to each port 42 of node 40.

Additionally, the switch nodes (SN) contain either logic for identifying destination addresses associated with nodes that are reached by passing through the switch node, or logic that recognizes routing field values. In accordance with one embodiment, packets can be passed through a switch node to another port of the switch node based on the destination address value or the routing field value in the packet header.

More particularly, routing is performed within the switch nodes of the network. Routing can be performed in one of three ways: based on the packet routing field; by masking the packet destination address field; or by using a routing table. For all routing methods, the ports in a switch node are each designated with a port number. When a packet routing field is used, the packet routing for stage N in the packet journey is performed by sending the packet out to the switch port specified by number in the Nth entry in the routing field. When routing is performed by masking of the destination address, the switch contains a register which specifies the set of bits in the destination address field that contain the port number for this stage. The packet is routed out the port designated by that port number. When a routing table is used, a switch contains a table with a port number entry for a destination address, which designates the number of the port that is used to reach the destination address. Routing is performed by a table look-up and sending the packet out the specified port. For all these methods, the destination address is checked at the end of routing to ensure that the packet has reached the correct destination.

A self-identify and configure example for network 11 of FIG. 1 is next presented. Initially, the network is operational, but no topology information is known about the network and the nodes have not been configured. Managing node (MN) 10 can obtain information about and configure nodes in the network as follows.

The port configuration register associated with port 30 of MN 10 is initially set to change, for example, packet destination addresses to the all-node address designation as the packets leave the port. A packet containing a request for the managing node address of the next adjacent node is sent to exit out this port, with the port control register dictating that the destination address field be automatically converted to the all-node address designation, for example, to an all zeros address. Because the packet is transmitted with the all-node address designation, the next adjacent node, SN 20, receives the packet. Switch node 20 then constructs a response packet and returns an unconfigured managing node address value (e.g., all zeros) in the response packet. MN 10 receives the response packet from SN 20 and recognizes that the managing node address in the managing node address register of node 20 has not yet been configured.

MN 10 then sends a packet to SN 20 to write its own managing node address into the managing node address register of switch node 20. Thereafter, managing node 10 sends a request packet to read the node address register of switch node 20. Assuming that the register is unconfigured, the managing node sends another packet to write the node address register of SN 20. Managing node 10 will also write routing information into switch node 20. Once completed, switch node 20 is configured for operation and the port control register associated with port 30 of the managing node 10 is reset to normal destination address processing, i.e., the control indicator for inserting the all-node address designation is removed.

Switch node 22 can next be configured. The port control register associated with the depicted port 30 on SN 20 connected to SN 22 is set to convert, for example, the destination address field of packets sent from the port to the all-node address designation, which again, may comprise an all zero value. A packet requesting a read of the managing node address register in SN 22 is sent to exit out port 30 of SN 20 coupled to SN 22, and is thus received by SN 22. Switch node 22 responds with its managing node address value. If the managing node address value is unconfigured, managing node 10 proceeds to initialize and configure SN 22. (If, however, the managing node address value is non-zero, managing node 12 has already configured SN 22.) Assuming that switch node 22 is unconfigured, the node becomes configured as required following the above-described procedure for switch node 20.

This process is repeated for all switch nodes and end nodes in the network. Managing nodes do not need to be configured since they configure themselves and contain their own address in the managing node address register. As other managing nodes, such as managing node 12, start configuring the network using the above process, they will reach, for example, switch node 20, read the managing node address register contained therein and recognize that the switch node has already been configured. If a problem is detected by a given node with the configuration of switch node 20, the given node will notify its managing node. The notified managing node will attempt to communicate with managing node 10, and if managing node 10 is found to be non-operational, the notified managing node will write its address in the managing node address of switch node 20 and reconfigure switch node 20 as necessary.

Once the node is configured with a node address and a managing node address, it is able to send notifications about changes in the network topology. If a link connected to the port of a configured node becomes operational, the configured node sends a notification packet (with the packet type set to notification) to its managing node to announce the new addition to the network. Likewise, if a link connected to a port of a configured node stops operating, a notification packet is sent to the managing node to announce the removal of the link from the topology. Through the above processes, the topology of the network is determined, nodes of the network are configured, and changes to the topology can be automatically announced.

Figure 5A:
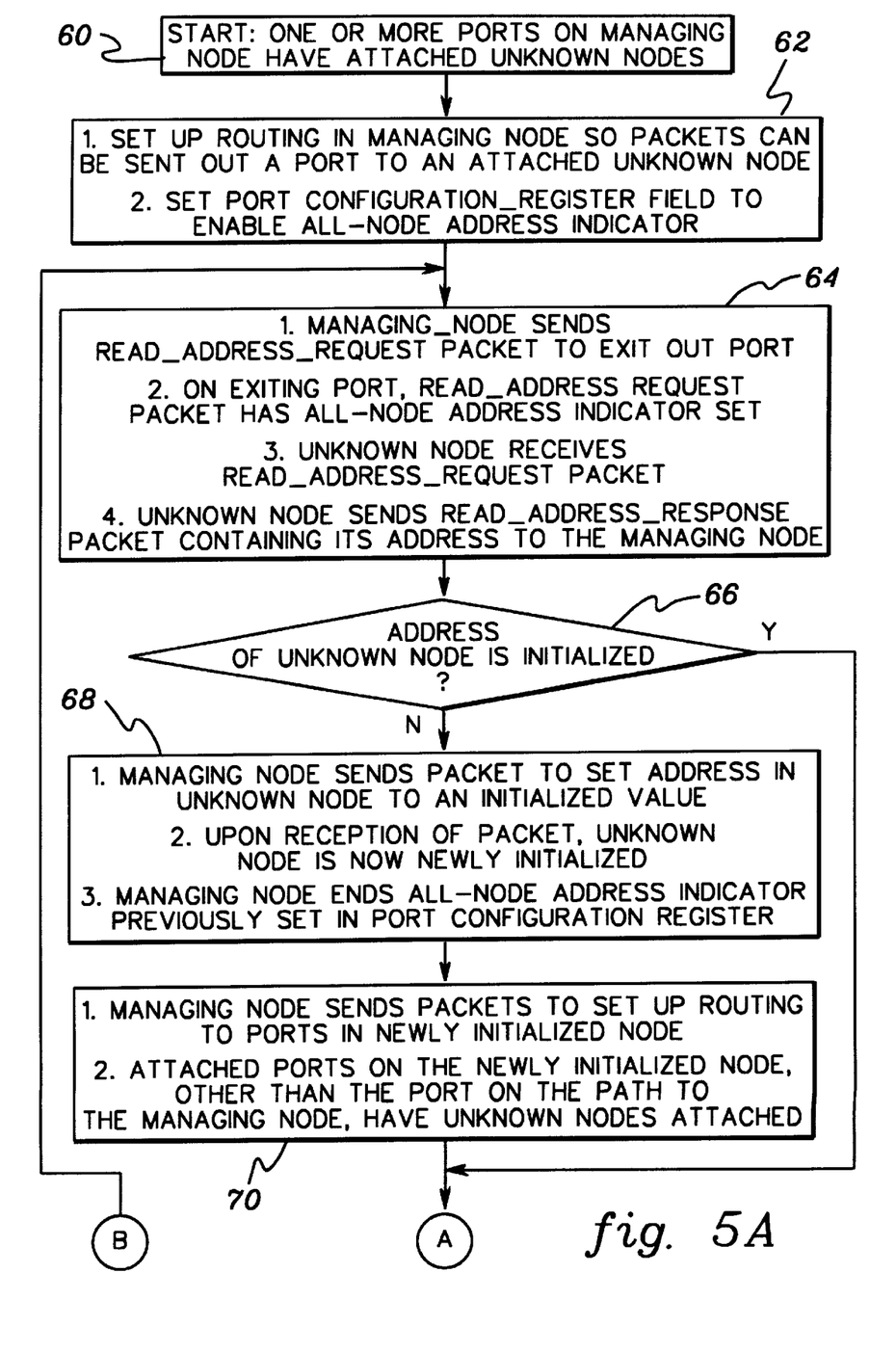
FIGS. 5a & 5b are a flowchart of one embodiment of identification and configuration processing in accordance with the present invention.
Figure 5B:
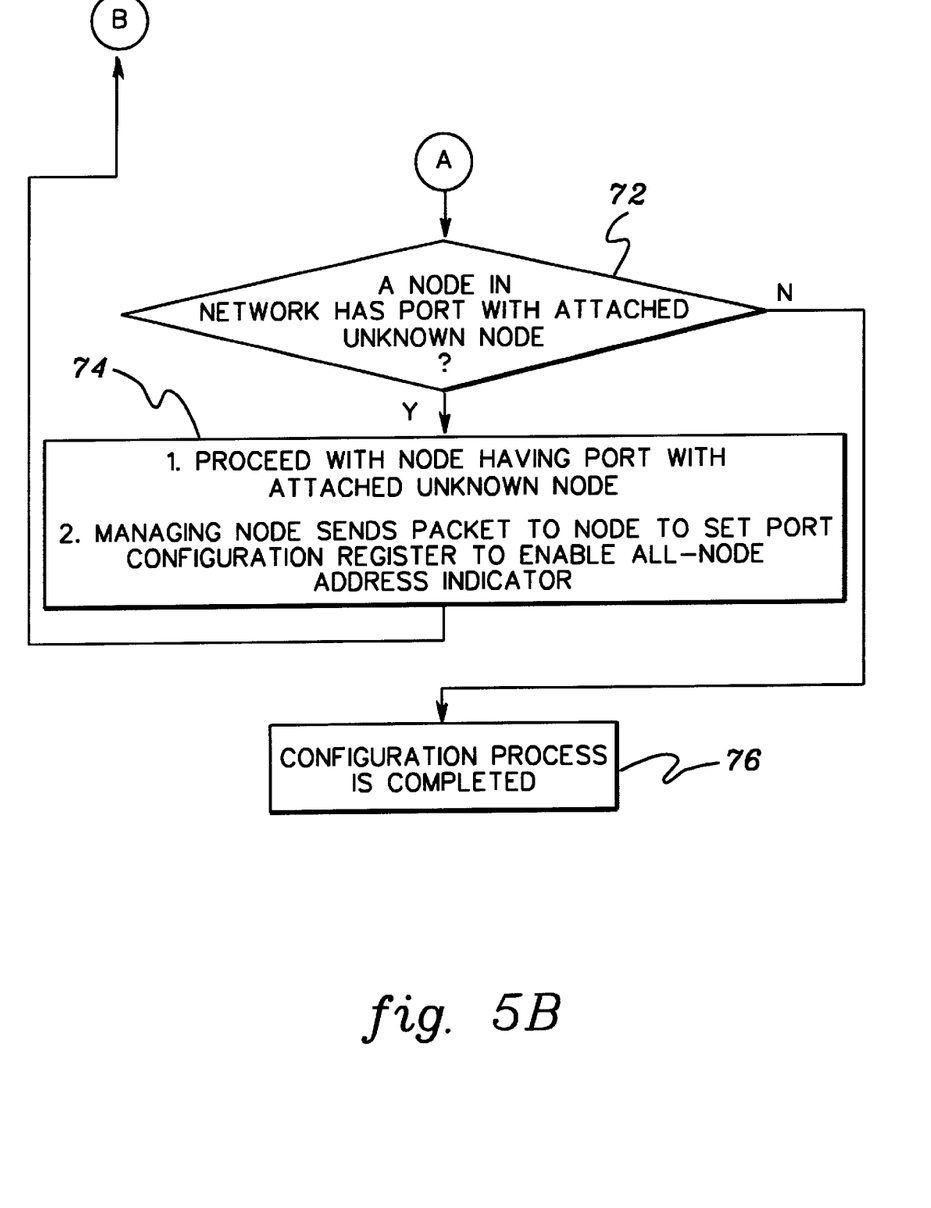

FIGS. 5a & 5b present in greater detail a flowchart for identifying and configuring the topology of a network comprised of a plurality of interconnected nodes. Again, the network is assumed to be operational, but with an unknown topology (60). Routing is set up within the managing node so packets can be sent out a port to an attached unknown node (62). This includes setting the port configuration register such that any packets exiting through the port receive the all-node address designation.

A request packet is initially sent from the managing node to the unknown node to read the node address. On exiting the port, the request packet has the all-node address indicator inserted therein. The unknown node receives the read request packet and responds to the managing node with a response packet containing its address (64).

Upon receipt of the response packet, the managing node determines whether the address of the unknown node is initialized (66). If not, the managing node sends a packet to set the address of the unknown node to an initialized value. Upon receipt of the packet, the unknown node becomes initialized. The managing node can then terminate the set status of the port configuration register since the next adjacent node address is now known (68).

The managing node next sends packets to set up routing to ports in the newly initialized node. The ports of the newly initialized node, other than the port on the path to the managing node, are assumed to have unknown nodes attached thereto (70). Inquiry is then made whether any node in the network has a port with an attached unknown node (72). Note also, if the address of the unknown node was initialized at first reading (66), then processing would have directly determined whether a node in the network has a port with an attached unknown node (72).

Assuming unknown nodes remain, processing proceeds with a selected node having a port with an attached unknown node (74). The managing node sends packets to the selected node to set the port configuration register to insert the all-node address designation into any packets leaving that particular port. Processing then proceeds as described above in connection with the managing node and its next adjacent node with unknown node address. Once all nodes in the network have ports with known nodes attached thereto, configuration processing is completed (76).

Those skilled in the art will note from the above discussion that this invention comprises a system and method for identifying and configuring the nodes of a network when an unknown or partially unknown topology is present. The invention employs a progressive identification of the network by allowing the interrogation of next adjacent network nodes beyond those previously identified. Specifically, network topology is progressively discovered through a process that proceeds by identifying the network node by node, where each additional new node is located at the other end of a link from a previously identified node. The approach presented herein allows self-identification of the network, while still being inexpensive to implement. Further, an approach is presented for configuring all nodes of the network so that node configurations can be managed from multiple managing nodes in the network simultaneously. Monitoring of a discovered topology is possible to identify additions, deletions or other changes to the network. Race conditions or conflicts between multiple managing nodes are avoided. Also, the system/method can be employed with any arbitrarily connected topology made up of managing nodes, switch nodes and end nodes.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. A system for use in identifying the topology of a network having a plurality of nodes, each node having a port for transfer of a packet to a next adjacent node in the network, said system comprising:

an all-node address indicator for selective insertion in a field of the packet according to whether a node address of the next adjacent node is known, wherein when inserted in the field of the packet, said all-node address indicator causes the packet to be received by the next adjacent node in the network notwithstanding that said node address of the next adjacent node in the network is unknown when forwarding the packet;

means for selectively inserting the all-node address indicator into said field of said packet at each node in the network with a known node address when said node with a known address has a next adjacent node in the network with an unknown node address to address and thereby identify said next adjacent node; and wherein said means for selectively inserting comprises means for not inserting the all-node address indicator when said node with a known address has a next adjacent node with a known address.

2. The system of claim 1, wherein said means for selectively inserting comprises means for progressing stepwise through the network to identify each node of said plurality of nodes.

3. The system of claim 1, wherein at least one node of said plurality of nodes comprises a managing node, and wherein said means for selectively inserting comprises control means disposed at said managing node for remotely employing the all-node address indicator to identify in stepwise progression each next adjacent node in the network with unknown node address connected to a node in the network with known node address.

4. The system of claim 1, wherein the all-node address indicator for selective insertion in the field of the packet comprises a universal indicator for selective insertion in either the destination address field of the packet or the routing field of the packet.

5. The system of claim 1, wherein said plurality of nodes includes multiple switch nodes, each switch node having multiple ports, each port having a different next adjacent node connected thereto, and wherein said means for selectively employing comprises means for selectively inserting the all-node address indicator at each port of each switch node with known node address having a next adjacent node in the network connected thereto with an unknown node address.

6. The system of claim 1, wherein the network comprises an interconnection network within a computer system, and wherein said plurality of nodes comprises a managing node, multiple switch nodes, and multiple end nodes, said managing node comprising a processor node, and said multiple end nodes comprising storage and communication device connection nodes.

7. A system for use in identifying the topology of a network having a plurality of interconnected nodes, each node having a port for transfer of a packet to a next adjacent node in the network, said system comprising:

an all-node address indicator for selective insertion in a field of the packet according to whether a node address of the next adjacent node is known, wherein when inserted in the field, the all-node address indicator causes the packet to be received by the next adjacent node in the network;

each node having a port control register associated with said port which when set instructs the node to insert the all-node address indicator into the field of the packet before forwarding the packet to the next adjacent node in the network wherein said port control register is set when the next adjacent node has an unknown address;

means for remotely, selectively setting the port control registers associated with the ports of the plurality of interconnected nodes, wherein said all-node address indicator causes the packet to be received by the next adjacent node in the network notwithstanding that said node address of the next adjacent node in the network is unknown when forwarding the packet; and wherein said port control register is not set when the next adjacent node has a known address.

8. The system of claim 7, wherein said all-node address indicator comprises a universal destination address and said field comprises a destination address field in the packet.

9. The system of claim 7, wherein at least some nodes of said plurality of interconnected nodes comprise switch nodes, each switch node having at least two ports, and wherein each node of said plurality of interconnected nodes includes a node address register, and said packet comprises a request packet for reading a node address stored in the node address register of the next adjacent node in the network with unknown node address.

10. The system of claim 7, wherein at least some nodes of said plurality of interconnected nodes comprise switch nodes, each switch node having multiple ports, each port having a port control register associated therewith, and wherein said means for remotely, selectively setting the port control registers comprises means for remotely, selectively setting each port control register associated with the multiple ports of each switch node with known node address having a next adjacent node in the network connected thereto with an unknown node address.

11. The system of claim 7, wherein at least one node of said plurality of interconnected nodes comprises a managing node, said means for remotely, selectively setting the port control registers including control means disposed at the managing node for progressively identifying each node of the network.

12. The system of claim 11, wherein the plurality of interconnected nodes of the network further comprises multiple switch nodes, each switch node having a managing node address register associated therewith, and said system further comprises means for reading and configuring the managing node address register of each switch node of the multiple switch nodes in the network from the managing node.

13. The system of claim 7, wherein the plurality of interconnected nodes includes multiple managing nodes, at least two managing nodes containing control means for progressively identifying each node of the network employing said means for remotely, selectively setting the port control registers, and said system further comprises means for avoiding race condition between said at least two managing nodes in identifying the topology of said network.

14. The system of claim 13, wherein the plurality of interconnected nodes of the network further comprises multiple switch nodes, each switch node having a managing node address register associated therewith, and said means for avoiding race condition comprises multiple set count registers, each set count register being associated with a different managing node address register of the multiple switch nodes.

15. The system of claim 14, wherein said means for avoiding race condition further comprises means for reading a set count value from the set count register associated with each managing node address register when identifying the next adjacent node in the network with unknown node address and for writing a managing node address into said managing node address register only if the set count value of the associated set count register is unchanged from the set count value read from the set count register.

16. A self-identifying network comprising:

a plurality of interconnected nodes, each node having a port for transfer of a packet to a next adjacent node in the network;

an all-node address indicator for selective insertion in a field of the packet according to whether a node address of the next adjacent node is known, wherein when inserted in the field, said all-node address indicator causes the packet to be received by a next adjacent node in the network notwithstanding that the next adjacent node has an unknown node address;

automatic means for selectively inserting the all-node address indicator into said field of said packet at each node of the network with a known node address when said node with a known address has a next adjacent node with an unknown node address to access said next adjacent node and hence identify topology of the network; and wherein said automatic means for selectively inserting comprises means for not inserting the all-node address indicator when said node with a known address has a next adjacent node with a known address.

17. The self-identifying network of claim 16, wherein said automatic means for selectively inserting the all-node address indicator comprises means for stepwise progressing through the network to identify each node of the plurality of interconnected nodes.

18. The self-identifying network of claim 16, wherein the plurality of interconnected nodes comprises at least one managing node, multiple switch nodes and multiple end nodes, said at least one managing node being coupled to said multiple end nodes through said multiple switch nodes, each switch node having a port with a port control register field associated therewith which when set instructs the switch node to insert the all-node address indicator into the field of the packet before forwarding the packet to the next adjacent node in the network connected to said port, and wherein said automatic means for selectively inserting the all-node address indicator comprises means disposed at the at least one managing node for remotely, selectively setting the port control register fields associated with the ports of the switch nodes having a next adjacent node connected thereto with unknown node address.

19. The self-identifying network of claim 18, wherein said all-node address indicator comprises a universal destination address and said field of the packet comprises a destination address field in the packet.

20. The self-identifying network of claim 18, wherein said all-node address indicator comprises a universal routing indicator and said field of the packet comprises a routing field in the packet.

21. The self-identifying network of claim 18, wherein each node of said plurality of interconnected nodes includes a node address register and a managing node address register, and wherein said self-identifying network further comprises means for configuring said multiple switch nodes and multiple end nodes from said at least one managing node by writing a specific node address into said address node register and a managing node address into said managing node address register of each switch node and end node having unconfigured address node and managing node address registers.

22. The self-identifying network of claim 21, wherein said at least one managing node comprises multiple managing nodes and said automatic means for selectively inserting the all-node address indicator comprises means disposed at at least two managing nodes of said multiple managing nodes for remotely, selectively setting the port control registers associated with the ports of the switch nodes having a next adjacent node connected thereto with unknown node address, and wherein said self-identifying network further comprises means for avoiding race condition between said at least two managing nodes in identifying topology of the network.

23. The self-identifying network of claim 22, wherein said means for avoiding race condition comprises multiple set count registers, each set count register being associated with a different managing node address register of the multiple switch nodes and multiple end nodes.

24. The self-identifying network of claim 23, wherein said means for avoiding race condition comprises means for writing a managing node address into a managing node address register of one node of said multiple switch nodes and multiple end nodes only if a previously read set count value in the associated set count register is unchanged, and means for incrementing the set count value upon writing the managing node address into the managing node address register.

25. The self-identifying network of claim 18, further comprising means for automatically notifying the at least one managing node of a change in the topology of the network after the at least one managing node has identified topology of the network.

26. The self-identifying network of claim 18, wherein said plurality of interconnected nodes are interconnected by bidirectional links having two ends, each end of each bidirectional link being coupled to a port of a node of the plurality of interconnected nodes, each port containing both transmitting logic and receiving logic for communicating packets across the bidirectional link coupled thereto.

27. A method for identifying topology of a network having a plurality of interconnected nodes, each node having a port for transfer of a packet to a next adjacent node in the network, a given node of the plurality of interconnected nodes having a known node address and being connected to a next adjacent node, said method comprising:

(a) sending a packet to the given node with known node address for output to the next adjacent node;

(b) upon receipt of the packet at said given node, providing in the packet an all-node address indicator when said next adjacent node of said given node has an unknown node address, said all-node address indicator directing the packet to be received by any node of the plurality of interconnected nodes;

(c) forwarding the packet from the given node to the next adjacent node with unknown node address, said packet having the all-node address indicator provided therein pursuant to said providing step (b), wherein upon receipt of the packet by the next adjacent node with unknown node address, the next adjacent node with unknown node address can be identified; and wherein said providing step (b) further comprises not providing the all-node address indicator in said packet when said next adjacent node has a known address.

28. The method of claim 27, wherein the packet comprises a request packet to read address node information from the next adjacent node with unknown node address, and wherein said method further comprises sending a response packet back to a node originating the request packet, said node originating the request packet comprising one node of said plurality of interconnected nodes, said response packet containing the node address of the next adjacent node with unknown node address.

29. The method of claim 27, wherein each port has a port control register field associated therewith which when set instructs the node to insert the all-node address indictor into a field of the packet before forwarding the packet to the next adjacent node in the network, and wherein said method further comprises selectively setting the port control register field associated with the port of said given node prior to said forwarding step (c), wherein said given node responds to setting of the port control register field by inserting the all-node address indicator into the packet prior to said forwarding step (c).

30. The method of claim 29, wherein at least one node of said plurality of interconnected nodes comprises a managing node, and wherein said method further comprises directing said selectively setting of the port control register fields from the at least one managing node of the plurality of interconnected nodes.

31. The method of claim 30, further comprising repeating steps (a)–(c) for multiple given nodes of the plurality of interconnected nodes such that topology of the network is progressively identified from said at least one managing node.

32. The method of claim 31, wherein said at least one managing node comprises multiple managing nodes, and wherein said method further comprises identifying topology of the network from at least two managing nodes of said multiple managing nodes, and automatically avoiding race condition between said at least two managing nodes in identifying the topology of the network.

33. The method of claim 31, further comprising monitoring the network for changes after identifying topology of the network, and automatically notifying the at least one managing node of a change in the topology of the network.

* * * * *